Sept. 16, 1969 YOSHIRO KAN 3,467,395
LUBRICANT SEAL HAVING CASING AND ITS HOLDING MEANS
Filed April 28, 1967 3 Sheets-Sheet 1
FIG. 1 (Prior art)
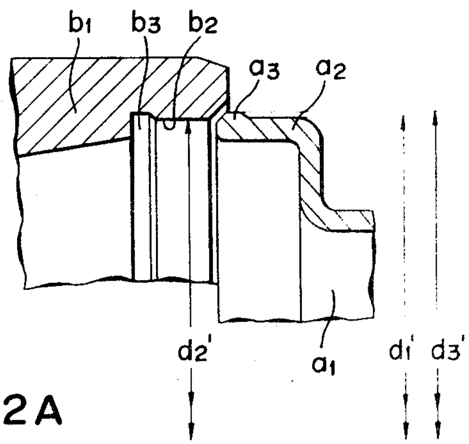
FIG. 2A
FIG. 2B
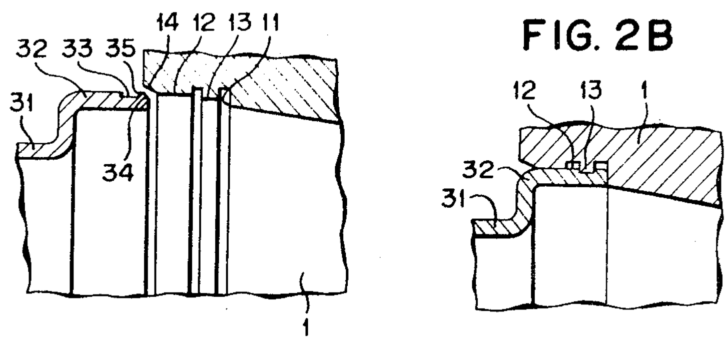
FIG. 3
FIG. 4
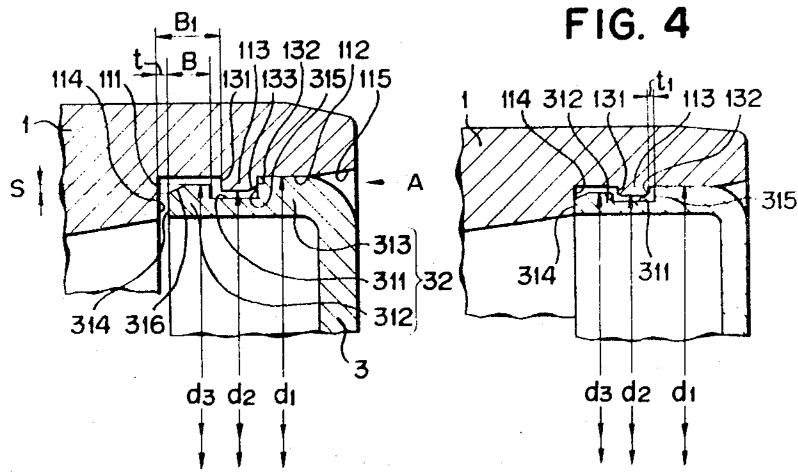

LUBRICANT SEAL HAVING CASING AND ITS HOLDING MEANS

United States Patent Office 3,467,395

Patented Sept. 16, 1969

3,467,395

LUBRICANT SEAL HAVING CASING AND ITS HOLDING MEANS

Yoshiro Kan, Fujisawa-shi, Japan, assignor to Nippon Seiko Kabushiki Kaisha, Tokyo, Japan, a corporation of Japan Filed Apr. 28, 1967, Ser. No. 634,689
Claims priority, application Japan, May 13, 1966, 41/43,773; Dec. 1, 1966, 41/78,328; Jan. 19, 1967, 42/4,486
Int. Cl. F16j *15/02;* F16c *33/78*
U.S. Cl. 277—37 4 Claims

ABSTRACT OF THE DISCLOSURE

This disclosure describes a novel press-fitting fluid-tight lubricant seal housing, an interlocking mounting bore, and novel lubricant and dust seals for use therein. The seal housing has an annular peripheral groove on the exterior sidewall, and the mounting bore has an annular peripheral projection or ring extending inwardly on the interior sidewall. The annular groove and projection interlock when the seal housing is telescoped into the mounting bore. An interior, cylindrical sidewall, connected to the exterior sidewall by a radially extending flange, has provision therein for retaining a dust seal element and an oil seal element. The oil seal has at least one seal lip at its inside peripheral portion extending axially inwardly. The dust seal lip is positioned adjacent the oil seal so as to form a pocket therebetween. The seal elements are made of separate pieces of elastomeric material.

This invention relates to a lubricant seal having a casing, and to its holding means.

The present invention comprises a lubricant seal of the type adapted for a press-fitting fluid-tight interlock within a mounting bore. An annular, peripheral groove is formed on the exterior of the sidewall of a cylindrical casing, the casing being formed from sheet metal within which there is provision for a lubricant seal. An annular, inwardly extending projection or ring is formed on the mounting bore. The groove and ring engage when the casing is telescoped into the mounting bore, and the sidewall of the casing and the sidewall of the mounting bore are thus press-fitted together. Further, the lubricant seal of the present invention comprises, in addition to the above-noted cylindrical casing sidewall, a second cylindrical sidewall having a smaller diameter than that of the first sidewall, and an inwardly-bent flange. Provided within the flange are seal elements comprising a dust seal and an oil seal. An inwardly directed flange determines the axial position of the seal elements. The dust seal has at least one seal lip at its inner periphery and the oil seal has at least one seal lip at its inner periphery, extending axially inwardly. The oil seal lip is provided with a coil spring action thereupon and a ring reinforces the oil seal at its outer periphery for avoiding deformation thereof. The dust seal is positioned at the inwardly bent flange and the oil seal is positioned axially adjacent to the dust seal within the second cylindrical sidewall.

Lubricant seals of the type having a snap-action fluid-tight interlock have been previously proposed. In one such proposal, a cupped casing is formed from heavy gauge sheet metal having a cylindrical sidewall and a radially directed, inturned flange at one end thereof. A layer of metal is trimmed from the exterior of the casing sidewall to provide a finished diameter slightly in excess of that of the mounting bore for the seal while leaving an untrimmed band of metal slightly narrower than a corresponding groove in the mounting bore wall, whereby the same is adapted to snap into said groove in said bore upon being telescoped thereinto. A ring is mounted within the flanged end of the casing, which ring is provided with a resilient sealing lip. The foregoing seal structure will be referred to again hereinbelow.

A sealing device comprising a pair of oppositely extending annular sealing lips formed from a unitary piece of resilient elastomer has also been proposed. One of these lips acts as a dust seal and the other acts as an oil seal. However, such a design does not have good durability, because the sealing action deteriorates through use in a rather short period.

In accordance with the present invention, dust and oil seals are made with two pieces of resilient elastomer, rather than one. This design has proven to have long durability without need for inspection and oiling, and is very easily detachable after a long period of use. Two-piece dust and oil seals are not novel per se, but suggested prior art designs have not been as successful in use as the present invention.

It is therefore a general object of the present invention to provide an improved lubricant seal of the type adapted for a press-fitting fluid-tight interlock.

It is another object of the present invention to provide a lubricant seal having seal elements of improved durability and which are easily detachable after use.

Various other objects and advantages of the invention will become clear from the following description thereof, and the novel features will be particularly pointed out in connection with the appended claims.

The invention will be described in detail, referring to the illustrative embodiments shown in the accompanying drawings, in which:

FIG. 1 is a partial, cross-sectional elevation of a press-fitting interlock according to the prior art;

FIG. 2A is a partial, cross-sectional elevation of a first embodiment of the press-fitting interlock according to the present invention, unassembled, and FIG. 2B is a similar view when it is press-fitted;

FIG. 3 is a partial, cross-sectional elevation of a second embodiment of the interlock of the present invention;

FIG. 4 is a partial, cross-sectional elevation of a third embodiment of the interlock of the present invention;

Figure 5:
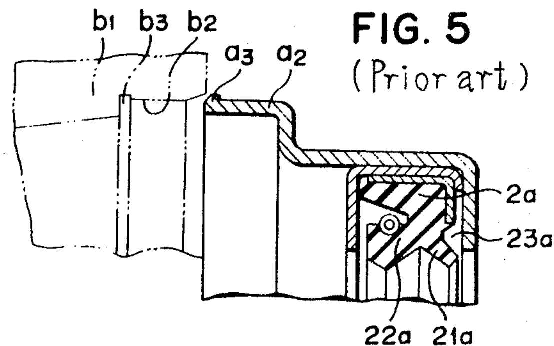
FIG. 5 is a partial, cross-sectional elevation of a seal element according to the prior art which is provided within the casing shown in FIG. 1.

The structure of a conventional means for fixing an oil seal of this kind is shown in FIG. 1. An annular peripheral projection $a_3$ is formed on the outer periphery of the open-end side of the fitting cylindrical portion $a_2$ at one end of the casing $a_1$ by trimming metal away. The mounting bore $b_2$ of outer race $b_1$ has an internal diameter $d_2'$, which is smaller by a small increment than the external diameter $d_1'$, of the corresponding cylindrical portion $a_2$ of said casing. An annular groove $b_3$ is provided at the inner end of bore $b_2$, and this is fitted to the peripheral projection $a_3$ when the two pieces are interlocked against each other. Groove $b_3$ has a slightly larger diameter than the external diameter $d_3'$, of projection $a_3$. The groove $b_3$ and the projection $a_3$ are interlocked to each other by pressing the fitting cylindrical portion $a_2$ of the case into mounting bore $b_2$, and at the same time the outer peripheral surface of the fitting cylindrical portion $a_2$ and the inner cylindrical surface of the mounting bore $b_2$ are fixed by press-fitting against each other.

In the foregoing structure, when the casing is fitted into the mounting bore $b_2$, the projection $a_3$ is forcibly pressed against the long cylindrical surface of the mounting bore $b_2$, and permanent deformation of the outer race of the bearing or the casing can occur. The cylindrical surface of mounting bore $b_2$ can also be scratched by projection $a_3$, and the fitting operation in general is very difficult.

A further problem with this design is that the slightly larger diameter $d_1'$ of casing sidewall $a_2$ tends to deform this portion inwardly when it is press-fitted into mounting bore $b_2$, and this lessens the interlock between projection $a_3$ and groove $b_3$. Also, the trimming away of metal from sidewall $a_2$ to form projection $a_3$ is a difficult and costly operation.

According to the present invention, it is quite easy to fit the oil seal casing into the outer race of a bearing or shaft box, and still provide a sufficiently tight fit between the cylindrical surface of the casing and the bore. The design of the invention improves the sealing efficiency on the fixed side, and makes it much easier to form the outer surface of the fitting cylindrical portion of the casing.

FIGS. 2A and 2B show an embodiment of the present invention. The casing has a cylindrical portion 31 of smaller diameter and a cylindrical portion 32 of larger diameter connected by a radially extending flange portion. A continuous, annuar peripheral groove 33 is formed on the outer surface 32 of the casing, close to the end of the portion 32 which is to be press-fitted into the mounting bore 11 of the outer race 1. A beveled surface 34 is provided at the end of the casing to facilitate press-fitting the casing.

The mounting bore 11 of the outer race 1 has a cylindrical surface 12 at its open end having a diameter slightly smaller than the external diameter of the cylindrical portion 32 of the casing. An annular, inwardly extending ring or projection 13 is located within bore 11 at the position corresponding to annular groove 33 of the casing. A bevel surface 14 is provided at the open end of bore 11 to facilitate press-fitting the casing.

The internal diameter of ring or projection 13 is slightly larger than or equal to the external diameter of the bottom of groove 33 of the casing, so the projection 13 will interlock firmly with the annular groove 33 when they are fitted together.

When the casing, including seal elements and the outer race 1 are manufactured as mentioned above, and as shown in FIG. 2, the cylindrical surface 12 of the mounting bore and the outer surface of the portion 32 of the casing are mutually press-fitted, and the projection 13 fits into groove 33, by the electric deformation of the casing when the casing is pushed into the outer race. This is shown in FIG. 2B.

The interlocking structure of the present invention has been explained in the foregoing paragraphs. As the casing is pressed in, the portion thereof which is press-contacted against the annular projection 13 of the mounting bore is remarkably short. Consequently, in accordance with the present invention, the fitting of the casing is remarkably easier, particularly when compared with the conventional oil seal, according to which projection is on the side of the casing, and is in pressing contact with the bore through the whole length traversed by the projection.

In other words, to press fit the device of FIG. 1, projection $a_3$ (of diameter $d_3'$) must be deformed down to the diameter of the bore ($d_2'$) and it remains so compressed as it slides along surface $b_2$, until it snaps into groove $b_3$. In the FIG. 2 embodiment of the invention, on the other hand, only a very slight deformation of the casing is required to slide the casing into the bore (due to the slight difference in diameter of the two) until projection 13 is reached. At this point, the casing must be compressed further to make the interlock, but the amount of movement needed to accomplish this is very small.

With the present invention, there is no fear that the cylindrical surface 12 of the outer race will be scratched, nor is there any fear that the casing will be permanently deformed. It is possible, further, to provide a comparatively larger overlap between the diameter of the outer race and that of the casing. A very tight fit is obtained, and there is no possibility for oil to leak out.

Preparing surface 32 of the casing is relatively easy, since there is no peripheral projection on the surface thereof. A centerless lathe, grinder, or such like cutting machine can be employed adapting the present invention for mass production.

A second embodiment of the present invention is shown in FIG. 3. The mounting bore 111 of the outer race 1 has a cylindrical inner surface 112 having an internal diameter $d_1$, which is slightly smaller than the external idameter of the cylindrical portion 313 of the casing, to provide a press-fit. Close to the back wall 114 of bore 111, an annular projection or ring 113 extends inwardly to engage the corresponding peripheral groove of the casing, described below. Bevel surface 133 on projection 113 and bevel surface 115 on surface 112 are respectively provided to make it easy to fit the casing into the bore and under peripheral projection 113.

The cylindrical portion of larger diameter of the casing, indicated generally at 32, has a freely fitting portion 312 of external diameter $d_3$ which is larger than the internal diameter $d_2$ of the projection 113, but smaller than the inner diameter $d_1$ of the cylindrical surface 112 of the bore. Portion 312 is at the extreme inner end of the casing, terminating at end surface 314. A bevel 316 is provided to facilitate movement under projection 113. The inner side of portion 312 defines one wall of peripheral groove 311. Thus, passage of the cylindrical surface 112 and peripheral projection 113 by the casing is smoother, and movement in the axial direction after the fixation can be regulated. At the same time the casing cannot be easily moved out during operation, since portion 313 has an external diameter which is larger than the internal diameter $d_1$ of cylindrical surface 112; thus, the two surfaces are press-fitted together.

The axial width B of the freely fitting portion 312 is smaller than the width $B_1$ between the inner wall 131 of projection 113 and the back wall 114. Further, a space $t$ is maintained between the back wall 114 of the mounting bore and the end surface 314 of the freely fitting portion 312 when the casing is fixed at its normal position.

The external diameter of perhipheral groove 311 is slightly smaller than the internal diameter $d_2$ of peripheral projection 113.

When the casing 34, formed as described above, is pushed into the mounting bore 111 in the direction as is shown by an arrow A, the cylindrical surface 112 of the outer race and the outer surface of portion 313 of the casing are mutually press-fitted to each other, and the inner wall 315 of peripheral groove 311 is moved against the outer wall 132 of annular projection 113, fixing the position of the casing in the axial direction. The space $t$ between the end surface 314 and the back wall 114 of the mounting bore is maintained, and the peripheral groove 311 is interlocked against the annular projection 113 by the interlocking distance S.

FIG. 4 shows another embodiment of the fixing means, according to which the determination of the position of the casing in the axial direction is carried out by the end surface 314 of the freely fitting portion 312 and the back wall 114 of the mounting bore 111. The other structure is exactly the same as in the embodiment of FIG. 3. The determination of the position of the casing at the time when the casing is fitted, is as mentioned above in the present embodiment, and therefore the interval $t_1$ is maintained between the outside surface 315 of the groove 311 and the outer wall 132 of the annular projection 113.

The fixing means of the present invention, as described above in connection with FIGS. 3 and 4, provides that when the casing is fitted into the mounting bore, the portion of the casing press-contacted against the peripheral projection is remarkably short, amounting to only the freely fitting portion (312), which is smaller than the internal diameter of surface 112. Therefore, compared to the conventional means in which the peripheral projection is provided on the open end side of the casing, there is no fear that the cylindrical surface of the mounting bore be scratched, or that the casing or outer race be deformed.

In accordance with the present invention, the peripheral projection is provided on the inside of the mounting bore, and the freely fitting portion of the casing is smaller in diameter than the cylindrical surface of the mounting bore. A comparatively large overlap, not restricted by a peripheral groove, can be provided between the cylindrical surface of the mounting bore and the cylindrical portion of the casing and a very tight press-fit can thus be attained. At the same time it is possible to appropriately select the size of the external diameter of the freely fitting portion to provide the required interlocking distance between the peripheral groove and the annular projection. In this manner the sealing efficiency on the fixed side is increased, and at the same time is stronger against axial forces.

The foregoing has been directed to the means for fixing the seal casing within the mounting bore of an outer race of a bearing structure. Attention is now directed to the seal structure, also located within the casing.

In accordance with the present invention, a bearing sealing device is provided, which prevents grease sealed inside the bearing from leaking out, and which prevents water, sand, dust, powder from the brake produced as a result of friction, and other foreign matter from coming into the bearing. Thus, wearing of the sealed portion due to foreign matter is eliminated and, at the same time, deterioration of the grease is retarded.

Heretofore there have been proposed various kinds of sealing means for ball and roller bearings, but there is no truly satisfactory sealing means from the view of the efficiency, durability and also from the standpoint of ease of production.

For example, in the sealing means such as is shown in FIG. 5, which is generally known, the oil seal 2*a* is provided inside the casing. Dust, brake powder produced as a result of friction, and other foreign matter are simply prevented from entering by means of the outwardly turned auxiliary dust lip 21*a*, and foreign matter is accumulated, in the space 23*a* between the flange of the casing and the auxiliary lip. Foreign matter in space 23*a* reduces the flexibility of lip 21*a*, however, and can also scratch and tear it, thus reducing its useful life and allowing foreign matter to reach the grease and the bearings if it is not replaced prior to breakdown.

In accordance with the sealing means of the present invention, wear of the grease-sealed portion by foreign matter is prevented in such a way that a bearing can be used for a long period of time without requiring any checking or supplying any additional oil or grease. At the same time, the sealing ring can be easily connected or disconnected without any deformation of the outer race or sealing ring.

Figure 6:
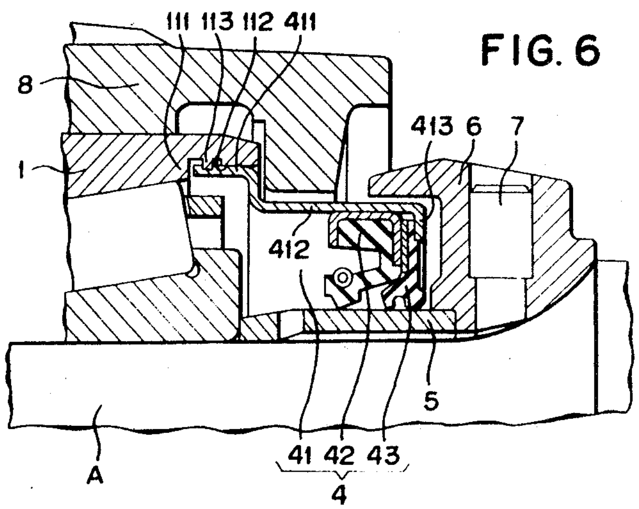
FIG. 6 is a partial, cross-sectional elevation of an embodiment of plural seal elements according to the present invention provided with the press-fitting interlock of the present invention.
Figure 7:
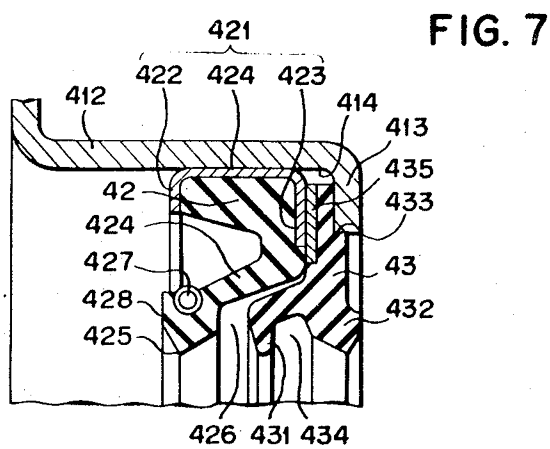
FIG. 7 is an enlarged view of the seal elements of FIG. 6.

FIG. 6 illustrates an embodiment of the sealing means for the tapered roller bearings used to support the shaft of a railway vehicle. An outer race 1 of the tapered roller bearing has a saddle 8 mounted thereon. The mounting bore 111 has a cylindrical press-fit surface 112 therein, together with annular, inwardly projecting ring 113. The casing comprises an outer cylindrical portion 411, press-fitted into mounting bore 111, an inner cylindrical portion 412, containing the seal rings, and an inwardly extending flange 413. The seal structure rides on a ring 5 attached to shaft A, which also carries a rear cap 6 having an air vent stopper 7.

The sealing rings, indicated generally at 4, comprise the casing 41, an oil seal 42, and a dust seal 43, the sealed portion being protected by the mutual action of oil seal 42 and dust seal 43.

The flange 413 acts as a stopper for determining the position of the seal in the axial direction. The casing 41 is shaped so that the cross sectional surface thereof may be characterized as comprising two generally L-shaped sections connected in step fashion.

The oil seal 42 is retained by a reinforcing ring 421, which has three parts: a flange 422 as the click portion for pushing the click of a drawing tool when the sealing ring is removed from the outer race, a flange 423 for reinforcing the elastic portion of seal, and a cylindrical portion 424. A grease lip 424' inside ring 421, is made of elastic material and is extended internally in the axial direction, and has an annular coil spring 427 to press it against ring 5. The entire elastic structure is, by means of baking or adhesion, made integral with the reinforcing ring 421. The end surface 428 of said grease seal is slightly projected in the axial direction from the plane of flange 422, and the coil spring 427 is a little misaligned towards the flange 423 of the reinforcing ring from the projected end 425 of the lip. The external diameter of the oil seal (in this case, the external diameter of the reinforcement ring 421), is made slightly larger than the internal diameter of the cylindrical portion 412 of the casing, so that the whole structure presses inwardly against ring 5.

The dust seal 43 is reinforced by the annular reinforcing plate 435, and is made of an elastic material which is a little harder than the elastic material of the oil seal 42. On the internal periphery, the small lip 431 is provided, and it is internally extended in the axial direction. The large lip 432, directed outwardly in the axial direction, is also provided, and a grease pocket 434 is defined in the space between the two lips. The outer periphery of dust seal 43 is smaller than the internal diameter of cylindrical casing portion 412, and is fixed in position by means of a shoulder 433 which fits under the edge of flange 413.

The casing 41, into which is placed, as mentioned above, the oil seal 42, and the dust seal 43, are assembled into the sealed ring (4) by inserting the dust seal 43, with large lip 432 outside, into the flange 413 of the cylindrical portion 412 of the casing, and by press-fitting the oil seal 42 in parallel with the dust seal with the grease lip 424' turned inside, thus forming a second grease pocket 426 between the small lip 431 of the dust seal and the lip 424' of the oil seal. After assembly, the casing is press-fitted into the mounting bore, the respective lips of the seals are contacted against the outer peripheral surface of the ring 5, and grease is filled into the grease pockets 426, 434.

Figure 8:
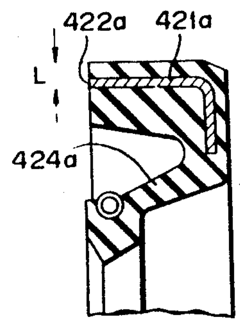
FIG. 8 is a partial, cross-sectional elevation of another embodiment of oil seal in accordance with the invention.

FIG. 8 shows another embodiment of oil seal according to which the reinforcing ring 421*a* has a general L shape, having only the flange for reinforcing on one end thereof. The outer surface thereof is wrapped with elastic material which forms lip 424*a*, and the width L, from the surface of the external diameter of the seal to the surface of the internal diameter of the reinforcing ring, is comparatively larger. The end surface 422*a* of the reinforcing ring is the surface which is faced against the click of the drawing tool for removing the sealed ring.

Figure 9:
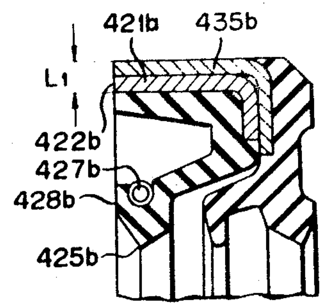
FIG. 9 is a partial, cross-sectional elevation of another combination of oil seal and dust seal of the present invention.

FIG. 9 shows another embodiment according to which the cross sectional surface of the reinforcing plate 435*b* of the dust seal has a general L shape, and the oil seal is pressed into the inside thereof. In this manner, the oil seal and the dust seal are joined into an integral unit. In accordance with this embodiment, the end surface **422*b*, having the width $L_1$ in the radial direction formed by laying the reinforcement ring 421*b* over the reinforcing plate 435*b*, becomes the surface facing against the click of the drawing tool. The end surface 422*b* is on the same plane (in the radius direction) as the end surface 428*b* of the grease lip, and the coil spring 427*b* is in the same plane as end 425*b*** of the grease lip.

Figure 10:
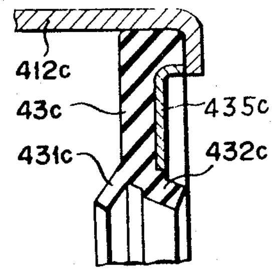
FIGS. 10 and 11 are similar views of further embodiments of the dust seal of the present invention.

FIG. 10 shows another embodiment of the dust seal, wherein the big lip **432*c* of the seal 43*c* is comparatively thinner, and the flexibility of the lip itself is relatively greater. At the same time the small lip 431*c* is extended internally in the axial direction. Casing section 412*c* has the same general configuration for retaining the dust seal, but reinforcing plate 435*c*** is placed on the outside (and can be an extension of the flange).

Figure 11:
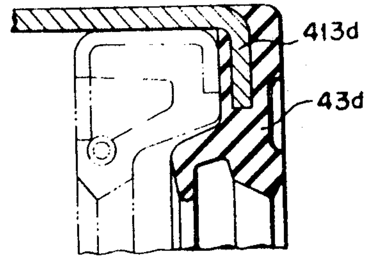

FIG. 11 is still another embodiment of the dust seal, according to which the dust seal **43*d* is formed on the flange portion 413*d*** of the casing directly by means of baking or adhesion, whereas in accordance with foregoing embodiments the dust seal is formed separately from the casing. In this case, there are two parts of the sealing ring, but the assembly of the sealing ring itself becomes easier, compared with the embodiments wherein the dust seal is separately provided.

In summary, in the sealing portion of the invention, the grease lip 424, the small lip 431, and the large lip 432 are in sliding contact with the outer peripheral surface of the moving ring 5, and grease is filled into and retained by the respective grease pockets. Foreign matter coming from the outside is primarily prevented by the large lip 432, is secondarily prevented by grease within the grease pocket 434, and is prevented tertiarily by the small lip 431. Attack by foreign matter on grease lip 424 is thus completely prevented.

Since the contact surfaces of the respective lips always have an oil film supplied by the grease within the grease pockets, the sealing efficiency is improved, and at the same time wear of the lip is reduced. Therefore, the sealing portion of the grease lip 424 is thus completely protected from foreign matter, and the sealing efficiency in the primary stage is retained for a suitably long time to prevent leakage of grease. It is thus possible to use the bearing for a long time without any further checking or supplying of oil. On the other hand, when the sealing ring is removed from the outer race, the click facing portion, which is devised so as not to be deformed in the axial direction by the cylindrical portion of the reinforcement ring, is adhered to the surface of the oil seal, and therefore it is possible to remove the same from the outer race easily, by hanging the click of the drawing tool against said click facing portion.

Any kind of dust seal having more than two lips on the internal peripheral side may be employed herein, and sometimes the small lip may be provided on the external side, and large lip provided on the internal side. Also, the material of the elastic bodies which constitute the dust seal and oil seal may be the same rather than using different materials. Various other changes in the details, steps, materials, and arrangements of parts, which have been herein described and illustrated in order to explain the nature of the invention, may be made by those skilled in the art within the principle and scope of the invention as defined in the appended claims.

What is claimed is:

1. A press-fitting, fluid-tight interlocking lubricant seal structure comprising:

an outer race having a mounting bore therein, said bore having an annular, radially inwardly extending projection near the inner end thereof;

cylindrical casing means having an open end press-fitted into said mounting bore and having an annular peripheral groove near said open end, said groove interlocking with said projection upon insertion of said casing means within said mounting bore; and sealing means located within said casing.

2. The lubricant seal structure as claimed in claim 1, wherein the outside diameter of the portion of said casing means between said groove and said open end is slightly less than the inside diameter of said mounting bore, and the outside diameter of the remainder of said casing inserted in said mounting bore has an outside diameter slightly greater than the inside diameter of said mounting bore.

3. The lubricant seal structure as claimed in claim 1, wherein said groove and said projection are positioned so that, upon interlocking thereof, the outer side of said projection abuts the inner side of said groove, thereby determining the axial position of said casing means.

4. The lubricant seal structure as claimed in claim 1, and additionally comprising a back wall in said mounting bore and wherein said groove and said projection are positioned so that, upon interlocking thereof, the open end of said casing means abuts said back wall, thereby determining the axial position of said casing means.

References Cited

UNITED STATES PATENTS

| | | | |
|---|---|---|---|
| 2,834,616 | 5/1958 | Gebert et al. | 277—212 X |
| 2,879,114 | 3/1959 | Bowen | 277—35 X |

FOREIGN PATENTS

| | | |
|---|---|---|
| 724,943 | 1/1966 | **Canada.** |

LAVERNE D. GEIGER, Primary Examiner

JEFFREY S. MEDNICK, Assistant Examiner

U.S. Cl. X.R.

308—36.1, 187.1; 277—58, 153, 178, 235